United States Patent
Wilfinger et al.

(10) Patent No.: US 8,873,029 B2
(45) Date of Patent: *Oct. 28, 2014

(54) COAXIAL GYRO ACCELEROMETER IN A SEMICONDUCTOR SUBSTRATE

(71) Applicant: Honeywell International Inc., Morristown, NJ (US)

(72) Inventors: Ray Wilfinger, Palm Harbor, FL (US); William E. Bailey, Trinity, FL (US); Carl Wingard, Oldsmar, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,699

(22) Filed: Sep. 24, 2012

(65) Prior Publication Data

US 2014/0085624 A1    Mar. 27, 2014

(51) Int. Cl.
*G01N 21/00*    (2006.01)

(52) U.S. Cl.
USPC ........................................... 356/72

(58) Field of Classification Search
USPC .................................... 356/72–73
See application file for complete search history.

(56) References Cited

U.S. PATENT DOCUMENTS

| | | | |
|---|---|---|---|
| 3,614,677 A | 10/1971 | Wilfinger | |
| 7,929,143 B2 * | 4/2011 | Wilfinger et al. | 356/460 |
| 2008/0013094 A1 | 1/2008 | Wilfinger | |
| 2011/0051144 A1 | 3/2011 | Wilfinger et al. | |

FOREIGN PATENT DOCUMENTS

| | | |
|---|---|---|
| EP | 1878999 A1 | 1/2008 |
| WO | 99/60337 A1 | 11/1999 |

OTHER PUBLICATIONS

Search report from counterpart European patent application No. 13175954.0, dated Feb. 5, 2014 4pp.
Fricke J et al: "Cantilever beam accelerometer based on surface micromachining technology",Journal of Micromechanics & Microengineering, Institute of Physics, Publishing, Bristol, GB, vol. 3. No. 4, L Dec. 1993, pp. 190-192.

* cited by examiner

*Primary Examiner* — Abdullahi Nur
(74) *Attorney, Agent, or Firm* — Shumaker & Sieffert, P.A.

(57) ABSTRACT

A coaxial gyro accelerometer device in a semiconductor substrate for simultaneously sensing coaxial linear and rotational forces. An exemplary device includes a resonating cantilever beam within a substrate and a package having a resonating cavity. The package supports the substrate while allowing the beam to resonate. The substrate also includes a piezoresistor driver, a piezoresistor sensor, and a semiconductor interferometric optical gyro. The piezoresistor driver and sensor are incorporated within the beam. The driver electrothermally resonates the beam. The sensor piezoresistively senses a signal that relates to an acceleration force out-of-plane of the beam. A waveguide of the semiconductor interferometric optical gyro is incorporated in the substrate around the beam. The gyro senses rotational motion about the axis that is the same as the acceleration vector (out-of-plane of the beam). The gyro also includes a laser source and a light detector. The beam is formed contiguously from the semiconductor substrate.

20 Claims, 3 Drawing Sheets

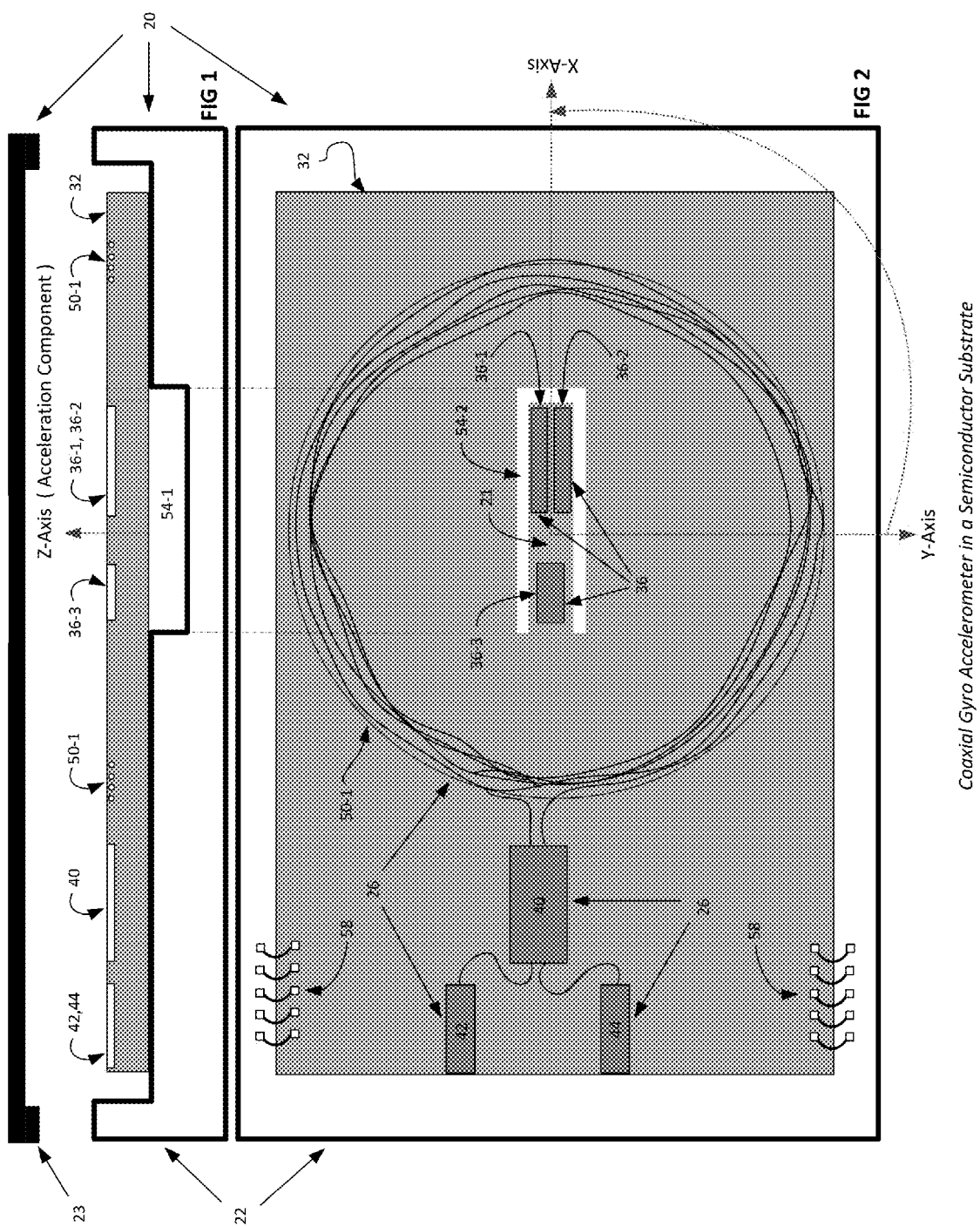

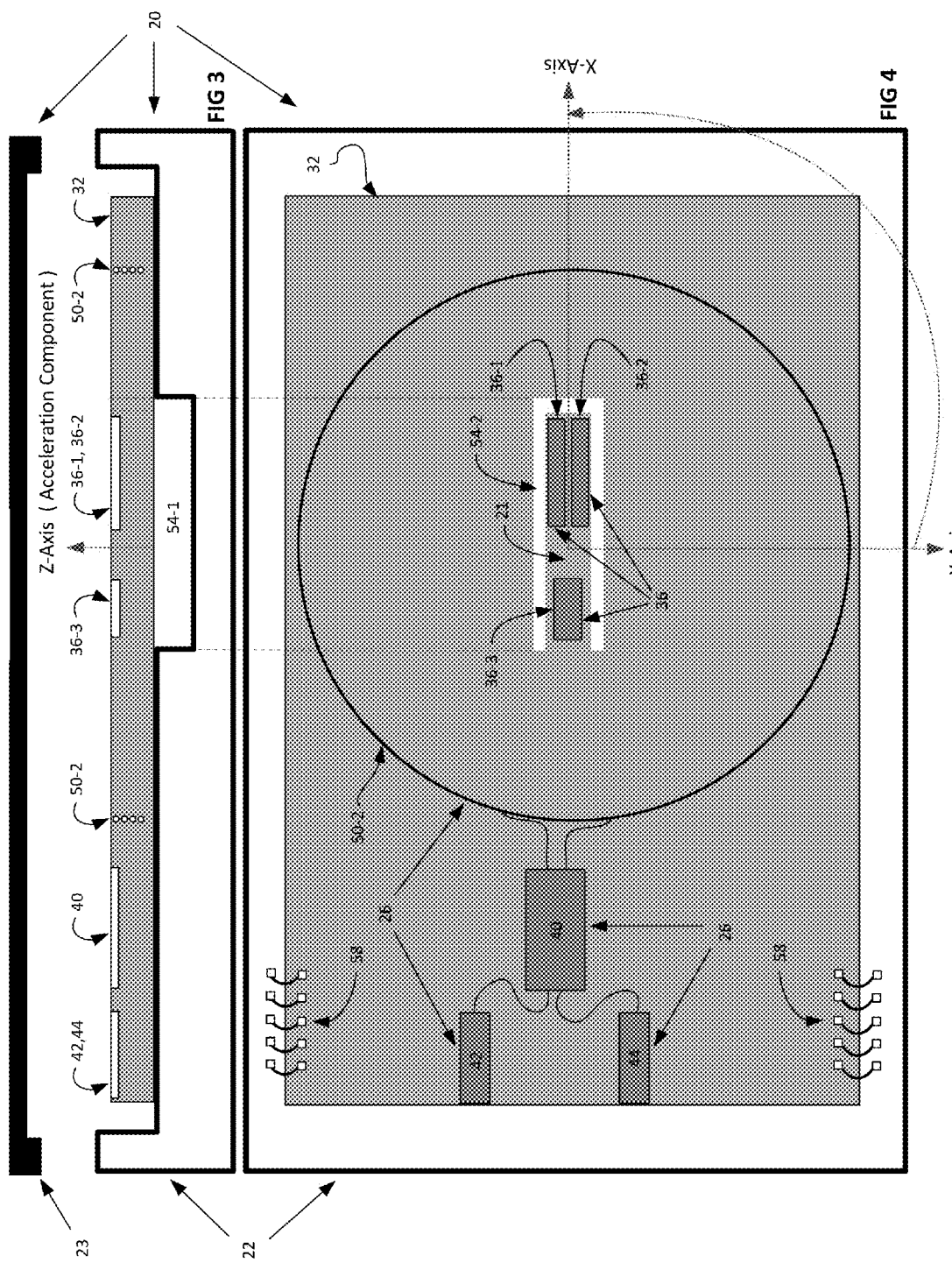

COAXIAL GYRO ACCELEROMETER IN A SEMICONDUCTOR SUBSTRATE

GOVERNMENT INTEREST

The invention described herein was made in the performance of work under U.S. Government Contract No. SC 00100000000145/US Navy N00030-05-C-0007. The Government may have rights to portions of this invention.

BACKGROUND OF THE INVENTION

A pendulating integrating gyroscopic accelerometer (PIGA) is a type of accelerometer that can measure acceleration and simultaneously integrate this acceleration against time to produce a speed measure, as well. The PIGA's main use is in inertial navigation systems (INS) for guidance of aircraft and most particularly for ballistic missile guidance. It is valued for its extremely high sensitivity and accuracy in conjunction with operation over a wide acceleration range. The PIGA is still considered the premier instrument for strategic-grade missile guidance, though systems based on MEMS technology are attractive for lower performance requirements.

However, the PIGA has significant size and weight that make it non-optimum in many applications. Also, the PIGA is a mechanical mechanism requiring high-precision machining tolerances and, thus, is very expensive to manufacture.

SUMMARY OF THE INVENTION

The present invention provides an integrated interferometric gyroscope and accelerometer device for simultaneously sensing coaxial linear and rotational forces. An exemplary device includes a resonating cantilever (RC) beam within a substrate, a sensor package having a cavity for the RC beam, a piezoresistor driver, a piezoresistor sensor, and a semiconductor interferometric optical gyro. The piezoresistor driver and sensor are incorporated within the RC beam. The driver electrothermally resonates the RC beam. The sensor piezoresistively senses a signal that relates to an acceleration force out-of-plane of the RC beam. A waveguide of the semiconductor interferometric optical gyro is incorporated in the substrate around the RC beam. The gyro senses rotational motion about the axis that is the same as the acceleration vector (out-of-plane of the RC beam). The gyro also includes a laser source and a light detector. The RC beam is formed from the semiconductor substrate. The gyro includes a spiraled waveguide that is coaxial with a center of gravity (CG) point of the corresponding RC beam. Each determined center point is the point at which the z-axis passes through the respective RC beam.

In one aspect of the invention, the semiconductor substrate is a single silicon substrate.

In another aspect of the invention, the light source and light detector (laser diodes) include a P-N junction formed within a layer of the substrate.

In still another aspect of the invention, the interferometric optical gyro further includes interface electronics formed in or on the substrate.

In yet another aspect of the invention, the device includes a sensor package lid that is hermetically sealed with the sensor package.

BRIEF DESCRIPTION OF THE DRAWINGS

Preferred and alternative embodiments of the present invention are described in detail below with reference to the following drawings:

FIG. 1 is a cross-sectional view of an exemplary device formed in accordance with an embodiment of the present invention;

FIG. 2 is a top view of the device shown in FIG. 1;

FIG. 3 is a cross-sectional view of an exemplary device formed in accordance with another embodiment of the present invention;

FIG. 4 is a top view of the device shown in FIG. 3; and

DETAILED DESCRIPTION OF THE INVENTION

Figure 5:
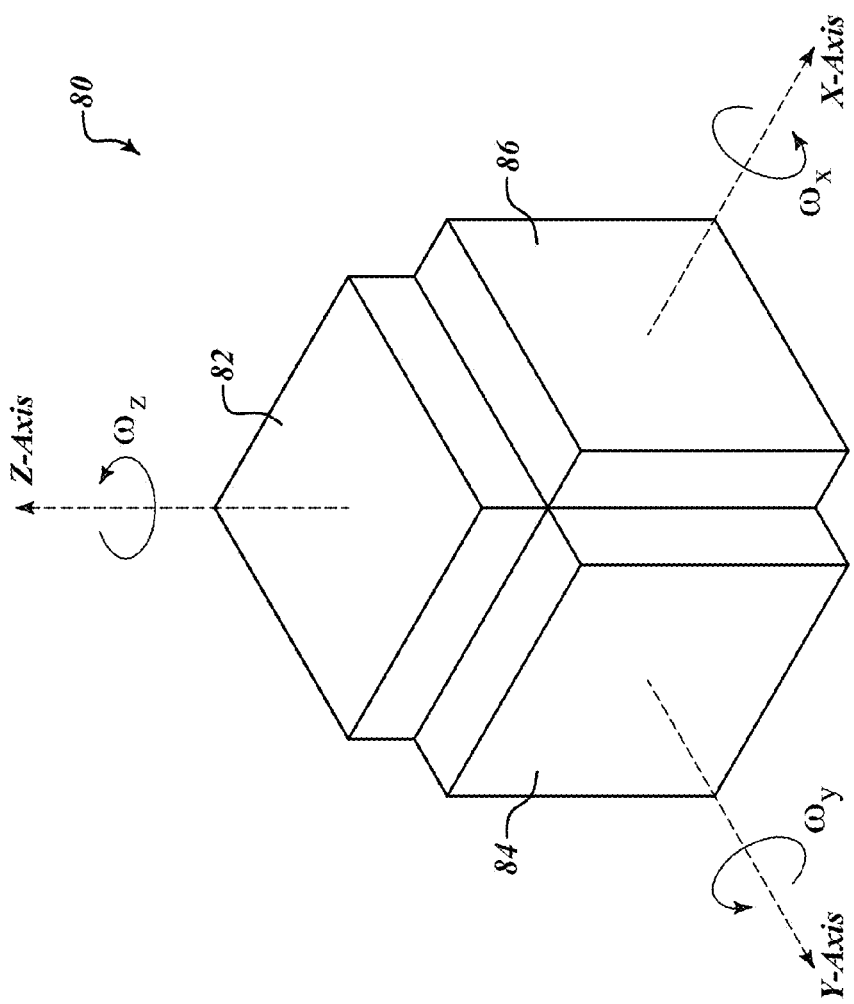
FIG. 5 is a perspective view of a three-axis gyro/accelerometer system formed in accordance with an embodiment of the present invention.

The present invention is a gyro and accelerometer integrated into a single semiconductor substrate that is combinable into a three-axis gyroscope/accelerometer. As such, the single semiconductor substrate has the ability to simultaneously sense linear and rotational forces.

As shown in FIGS. 1 and 2, an exemplary integrated gyro accelerometer device 20 includes a semiconductor substrate layer 32 that includes a semiconductor interferometric fiber-optic gyro (IFOG) 26 and a cantilever strain-resistive beam 21. The cantilever strain-resistive beam 21 includes a resonating component 36. The cantilever strain-resistive beam 21 is driven electrothermally to resonate by means of an implanted piezoresistor driver 36-1. Change in beam resonance (i.e., acceleration along the z-axis) is sensed piezoresistively by an implanted piezoresistor sensor 36-2. The piezoresistor implants (36-1, 36-2) are electrically coupled to a piezoresistor electronic component 36-3. In one embodiment the piezoresistor electronic component 36-3 is also located on the cantilever strain-resistive beam 21.

The piezoresistor electronic component 36-3 includes an oscillator circuit (not shown) for driving the piezoresistor driver 36-1 and a feedback circuit (not shown) for receiving signals from the piezoresistor sensor 36-2. The piezoresistor electronic component 36-3 is connected to the piezoresistor elements (36-1, 36-2) via surface metal traces (not shown). Other surface metal traces (not shown) connect the piezoresistor electronic component 36-3 with one or more substrate die pads (not shown). One or more bond wires 58 are attached to the substrate die pads and to sensor package lead frame (not shown).

In one embodiment, the resonating cantilever (RC) beam 21 is formed from a semiconductor material, such as silicon, gallium-arsenide, or comparable material, with a thickness/width/length to allow it to resonate, based on a mass-spring configuration. Force due to acceleration is transformed into a load that acts axially (z-axis) on the RC beam 21. The magnitude of the acceleration is related to the change in the RC beam's resonant frequency, which is sensed based on the frequency of the signal sent to the driver 36-1 and received by the sensor 36-2. The vector component of acceleration is perpendicular to the RC beam 21. A DC voltage is applied with a superimposed sinusoidal signal to the piezoresistor driver 36-1, thus producing cyclic heating and cooling of the driver 36-1, which causes the RC beam 21 to deflect and oscillate. The piezoresistor sensor 36-2 detects change in frequency of the RC beam 21. The resonating frequency change in the RC beam 21 is due to the load generated by the acceleration component along the z-axis. Acceleration sensor resolution is a function of the RC beam material/thickness/width/length.

The RC beam 21 is created from the semiconductor substrate 32 using one of the following exemplary methods: laser cut; plasma etch; water jet machined; or other comparable methods (see 54-2). The substrate 32 is attached to a sensor package base 22 having a resonating cavity 54-1. The resonating cavity 54-1 is located below the RC beam 21, thus allowing the RC beam 21 to flex along the z-axis.

The IFOG 26 includes an optical waveguide 50-1 that is incorporated on the substrate 32 surrounding the resonating cantilever component 36 with a ω rotational component wrapped around the vector of acceleration (i.e., around the z-axis). The optical waveguide 50-1 is formed into the substrate 32 in a spiral along the X-Y plane or vertically in the Z plane (see 50-2 in FIGS. 3 and 4). The IFOG 26 also includes a light source (laser diode) 42, a light detector (photo diode) 44, and IFOG interface electronics 40 (i.e., integrated optics chip (IOC)). The light source (laser diode) 42 and the light detector (photo diode) 44 are in optical communication with the optical waveguide 50-1 formed in the semiconductor substrate. The light source (laser diode) 42, the light detector (photo diode) 44, and/or the IFOG interface electronics 40 are in signal communication with the bond wires 58 via surface metal traces (not shown). The one or more bond wires 58 are attached to the substrate die pads and to sensor package lead frame (not shown). The IFOG 26 senses a rotational force about an axis (z-axis) that passes through the center of the optical waveguide 50-1 in accordance with known gyro principles.

An example of the resonating cantilever beam accelerometer with implanted piezoresistor elements (36) is shown and described in U.S. Pat. No. 3,614,677, the contents of which are hereby incorporated by reference.

An example of the semiconductor IFOG 26 is shown and described in U.S. Patent Application No. 2008/0013094 filed Jul. 14, 2006 (now abandoned), the contents of which are hereby incorporated by reference.

An example a semiconductor IFOG and accelerometer located on a resonating beam, as shown and described in U.S. Pat. No. 7,929,143, the contents of which are hereby incorporated by reference.

The components on the substrate 32 may be covered by a passivation layer, such as glass, for protecting the components. The components may be placed on the substrate 32 or created in the substrate 32.

A sensor package lid 23 is hermetically attached to the sensor package base 22 using a hermetic seal, thus encasing the RC beam 21. The resonating cavity 54-1 and the space encapsulated between the sensor package base 22 and a hermetically sealed cover 23 has a vacuum and/or is backfilled with an inert gas.

FIG. 5 illustrates a three-accelerometer, three-gyro system 80. The system 80 includes three integrated gyro accelerometers 82, 84, and 86 attached in an orthogonal relationship to a base. At time of construction of each of the separate integrated gyro accelerometers 82, 84, and 86, the precise center location of the IFOG (i.e., the center of the spiraled waveguide 50-1) is determined. The center of the spiraled waveguide 50-1 is coaxial with the center of gravity (CG) point of the corresponding RC beam 21. Each determined center point is the point at which the z-axis passes through the respective beams. When attached to form the device 80 as shown in FIG. 5, those known z-axis points are used to properly orient/attach the gyro accelerometers 82, 84, and 86 relative to one another about the base.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An integrated interferometric gyroscope and accelerometer device, the device comprising:
    a substrate comprising:
        a resonating cantilever beam; and
        an area that surrounds the resonating cantilever beam;
    a package comprising a resonating cavity collocated along an acceleration axis direction with the resonating cantilever beam;
    a driver incorporated within the resonating cantilever beam, the driver configured to electrothermally resonate the resonating cantilever beam;
    a sensor incorporated within the resonating cantilever beam, the sensor configured to sense a signal that relates to an acceleration force out-of-plane of the resonating cantilever beam; and
    a semiconductor interferometric optical gyro comprising an optical waveguide surrounding the resonating cantilever beam on the area of the substrate, the gyro being configured to sense rotational motion about an axis approximately equivalent to a vector corresponding to an acceleration force.

2. The device of claim 1, wherein the gyro further comprises a light source and a light detector.

3. The device of claim 2, wherein the resonating cantilever beam is formed from the same contiguous substrate material.

4. The device of claim 2, wherein the light source is formed within a layer of the substrate.

5. The device of claim 2, wherein the light detector is a photo diode.

6. The device of claim 1, wherein the substrate is a single silicon substrate.

7. The device of claim 1, wherein the interferometric optical gyro further comprises interface electronics located at least one of on or in the substrate.

8. The device of claim 1, further comprising a sensor package lid that is hermetically sealed with the sensor package.

9. The device of claim 1, wherein the driver is a piezoresistor driver and the sensor is a piezoresistor sensor.

10. The device of claim 1, wherein the optical waveguide defines a spiral that extends along a plane that is perpendicular to the acceleration axis direction.

11. The device of claim 1, wherein the optical waveguide is formed into a spiral that extends in the acceleration axis direction.

12. The device of claim 1, wherein the area that surrounds the resonating cantilever beam is attached to the package such that the resonating beam is aligned with the resonating cavity.

13. A method for sensing a rotational force and an acceleration force, the method comprising:
    electrothermally resonating a resonating cantilever beam;
    sensing a signal that relates to an acceleration force out-of-plane of the resonating cantilever beam; and
    sensing rotational motion of the resonating cantilever beam about an axis approximately equivalent to a vector corresponding to the acceleration force,
    wherein sensing rotational motion comprises using a semiconductor interferometric optical gyro having a waveguide incorporated in an area of a substrate around the resonating cantilever beam.

14. The method of claim 13, wherein the gyro further comprises a light source and a light detector.

15. The method of claim 13, wherein the substrate is a single silicon substrate and includes the resonating cantilever beam and the area around the resonating cantilever beam.

16. The method of claim 13, wherein the interferometric optical gyro further comprises interface electronics located at least one of on or in the substrate.

17. The method of claim 13, further comprising hermetically sealing the resonated cantilever beam within a sensor package.

18. The method of claim 13, wherein electrothermally resonating the resonating cantilever beam comprises electrothermally resonating the resonating cantilever beam with a piezoresistor driver and sensing the signal that relates to an acceleration force comprises sensing the signal with a piezoresistor sensor.

19. The method of claim 13, wherein the acceleration force is in an acceleration axis direction, and wherein the optical waveguide defines a spiral that extends along a plane that is perpendicular to the acceleration axis direction.

20. The method of claim 13, wherein the acceleration force is in an acceleration axis direction, and wherein the optical waveguide is formed into a spiral that extends in the acceleration axis direction.

\* \* \* \* \*